(12) United States Patent
Yano et al.

(10) Patent No.: US 7,227,407 B2
(45) Date of Patent: Jun. 5, 2007

(54) INTEGRATION AND TERMINAL ARRANGEMENT OF PARALLEL MONITOR CIRCUITS

(75) Inventors: Kohichi Yano, Kanagawa-ken (JP); Akihiko Fujiwara, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 85 days.

(21) Appl. No.: 10/982,886

(22) Filed: Nov. 8, 2004

(65) Prior Publication Data
US 2005/0099223 A1 May 12, 2005

(30) Foreign Application Priority Data
Nov. 11, 2003 (JP) .............................. 2003-380722

(51) Int. Cl.
*H01L 25/00* (2006.01)
(52) U.S. Cl. .......................................... 327/565; 327/77
(58) Field of Classification Search ................. 327/74, 327/75, 76, 77, 78, 79, 88, 89, 564, 565, 327/566
See application file for complete search history.

(56) References Cited

U.S. PATENT DOCUMENTS

| | | | |
|---|---|---|---|
| 5,936,384 A | 8/1999 | Fujiwara et al. | |
| 6,144,248 A | 11/2000 | Oosugi et al. | |
| 6,316,915 B1 | 11/2001 | Fujiwara et al. | |
| 6,404,170 B2 * | 6/2002 | Okamura et al. | 320/166 |
| 6,501,248 B2 | 12/2002 | Fujiwara | |
| 6,563,292 B2 | 5/2003 | Fujiwara | |
| 6,768,289 B2 | 7/2004 | Fujiwara | |
| 6,812,673 B2 | 11/2004 | Fujiwara | |
| 6,885,170 B2 * | 4/2005 | Okamura et al. | 320/166 |
| 6,977,480 B2 * | 12/2005 | Emori et al. | 320/104 |
| 7,034,580 B2 * | 4/2006 | Yano et al. | 327/74 |

FOREIGN PATENT DOCUMENTS

JP     2000-50495     2/2000

* cited by examiner

*Primary Examiner*—Jeffrey Zweizig
(74) *Attorney, Agent, or Firm*—Dickstein Shapiro LLP

(57) ABSTRACT

Integration and terminal arrangement of serially-connected parallel monitor circuits, capable of monitoring the terminal voltages of serially-connected capacitors, are disclosed. A semiconductor device has a predetermined number of parallel monitor circuits, corresponding to a number of capacitors existing in the system. The semiconductor device includes a number of capacitor terminals and transistor terminals distributed on a capacitor side surface or a capacitor side, and a number of connector terminals distributed on the side surface opposite to the capacitor side surface or the side opposite to the capacitor side.

75 Claims, 10 Drawing Sheets

INTEGRATION AND TERMINAL ARRANGEMENT OF PARALLEL MONITOR CIRCUITS

FIELD OF THE INVENTION

The present invention generally relates to integration and terminal arrangement of parallel monitor circuits. In particular, the present invention relates to an integral and terminal arrangement of serially-connected parallel monitor circuits, capable of monitoring the terminal voltages of serially-connected capacitors.

DESCRIPTION OF THE RELATED ART

Recently, capacitors, called EDLCs (electric double layer capacitors), have been used for a wide range of applications, including as storage systems for new energy, and hybrid/electric vehicles, and as power sources for electric appliances and communication devices. The advantages of the capacitors include shorter charging times and longer cycle lives, as compared to the conventional secondary batteries. On the other hand, having a low rated voltage of around 3 volts, the capacitors are usually connected in series to provide a large energy supply. This creates a problem of unequal voltage distribution, mainly due to the difference in leakage current and capacitance among the individual capacitors.

To solve this unequal distribution problem, each capacitor is usually provided with an electric circuit, called parallel monitor circuit, which monitors and controls the terminal voltage of each capacitor.

FIG. 1 schematically illustrates an exemplary configuration of a background parallel monitor circuit. As shown in FIG. 1, the background parallel monitor circuit is connected in parallel to a transistor TR, and to a capacitor C. The background parallel monitor includes a comparator CMP, and a reference voltage source outputting a reference voltage Vr.

In operation, the comparator CMP compares a terminal voltage V developed across the capacitor C with the reference voltage Vr. If the terminal voltage V exceeds the reference voltage Vr, the transistor TR is turned on and causes a charging current to bypass the capacitor. The amount of terminal voltage V increases as the charging progresses, until the voltage reaches the reference voltage Vr. In this way, the terminal voltage V of the capacitor C is maintained at the reference voltage Vr.

In this case, a number of the parallel monitor circuits correspond to a number of the capacitors C connected in series. For this reason, the parallel monitor circuits are usually prepared as discrete units, rather than as integrated circuits, thus increasing the overall circuit size and cost.

BRIEF SUMMARY OF THE INVENTION

Exemplary embodiments of the present invention provide an integrated circuit semiconductor device, having a plurality of serially-connected parallel monitor circuits, respectively connected in parallel to a plurality of serially-connected capacitors.

The number of parallel monitor circuits may change according to the number of capacitors. Alternatively, one or more semiconductor devices may be connected in series, according to the number of capacitors.

The semiconductor device includes a number of capacitor terminals and transistor terminals distributed on a capacitor side surface or a capacitor side, and a number of connector terminals distributed on the side surface opposite to the capacitor side surface or the side opposite to the capacitor side.

BRIEF DESCRIPTION OF THE DRAWINGS

A more complete appreciation of the disclosure and the attendant advantages thereof will be readily obtained as the invention becomes better understood by reference to the following detailed description when considered in connection with the accompanying drawings, wherein:

FIG. 1 is a schematic circuit diagram illustrating a background parallel monitor circuit;

FIG. 2 is a schematic circuit diagram illustrating a part of a semiconductor device according to an exemplary embodiment of the present invention;

FIG. 3 is a schematic diagram illustrating an exemplary terminal arrangement of the semiconductor device shown in FIG. 2;

FIGS. 4A and 4B are schematic circuit diagrams illustrating an exemplary terminal arrangement, when more than two of the semiconductor device of FIG. 2 are connected in series;

FIG. 5 is a schematic diagram illustrating another exemplary terminal arrangement of the semiconductor device shown in FIG. 2;

FIGS. 6A and 6B are schematic circuit diagrams illustrating another exemplary terminal arrangement, when more than two of the semiconductor device of FIG. 2 are connected in series;

FIG. 7 is a schematic diagram illustrating another exemplary terminal arrangement of the semiconductor device shown in FIG. 2; and FIG. 8 is a schematic diagram illustrating an exemplary terminal arrangement of connector terminals of the semiconductor device shown in FIG. 2; and FIGS. 9A and 9B are schematic circuit diagrams illustrating an operation of transmitting signals to or from a controller circuit, performed by the semiconductor device shown in FIG. 8.

DETAILED DESCRIPTION OF THE INVENTION

In describing preferred the embodiments illustrated in the drawings, specific terminology is employed for of clarity. However, the disclosure of this patent specification is not intended to be limited to the specific terminology contained herein and it is to be understood that each specific element includes all technical equivalents that operate in a similar manner. Referring now to the drawings, wherein like reference numerals designate identical or corresponding parts throughout the several views, particularly in reference to FIG. 2, a description is made of a semiconductor device IC according to a preferred embodiment of the present invention.

The semiconductor device IC includes an integrated circuit having a plurality of parallel monitor circuits connected in series. More specifically, the semiconductor device IC of FIG. 2 includes five parallel monitor circuits PM1 to PM5, corresponding, respectively, to capacitors C1 to C5 (only C1 and C2 are shown in FIG. 2). The number of parallel monitor circuits is preferably from five to ten, however, the number of parallel monitor circuits is not limited to such exemplary cases, as long as it corresponds to the number of capacitances present in the system. Further, the capacitors C1 to C5 are preferably arranged in order according to the level of the applied voltage. In this exemplary case, the capacitor C1 is placed at the high voltage side, while the capacitor C5 is placed at the low voltage side.

Figure 2:
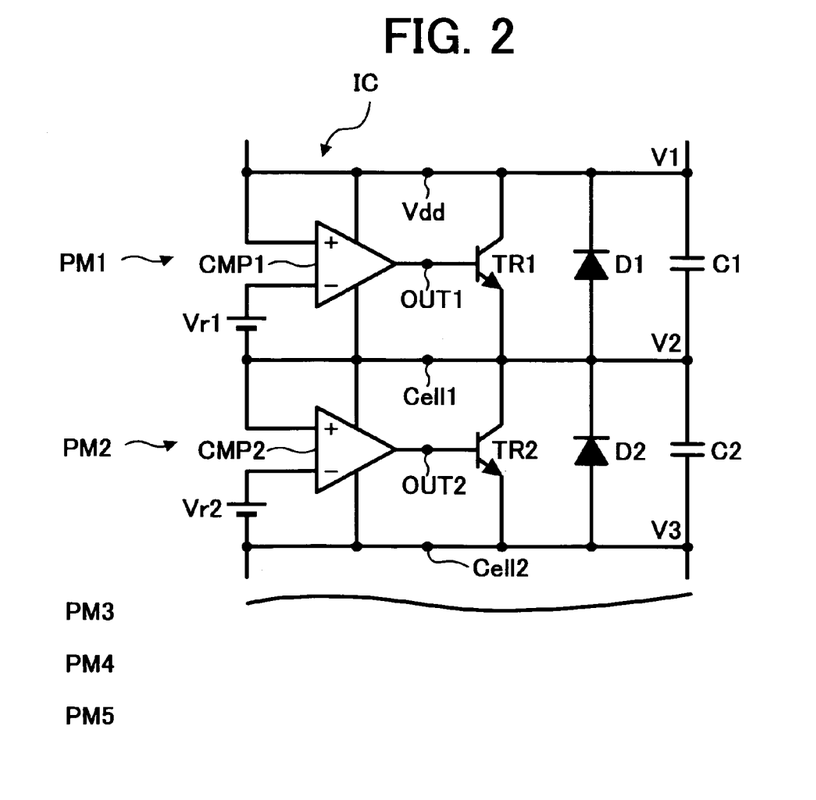

As shown in FIG. 2, the parallel monitor circuit PM1 mainly includes a reference voltage source Vr1 outputting a reference voltage of Vr1, and a comparator CMP1 formed of an EDLC. The parallel monitor circuit PM1 is connected in parallel to a transistor TR1 via a transistor terminal OUT1, and to a capacitor C1 via a positive supply terminal Vdd and a capacitor terminal Cell1. Further, the parallel monitor circuit PM1 may be connected in parallel to a diode D1, when the diode D1 is provided between the transistor TR1 and the capacitor C1.

Figure 1:
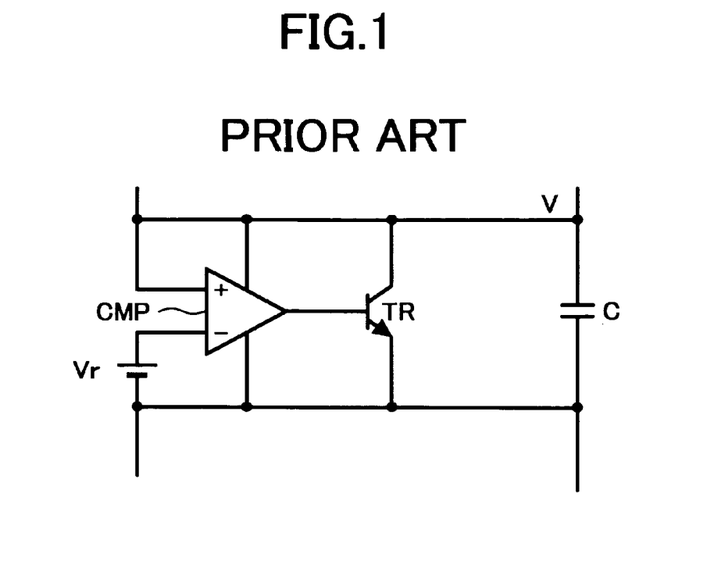

In operation, the parallel monitor circuit PM1 monitors and controls a terminal voltage V1 of the capacitor C1 within a predetermined value defined by the reference voltage Vr1, as described with reference to FIG. 1.

The circuit configurations and operations of the parallel monitor circuits PM2 to PM5 are substantially similar to those of the parallel monitor circuit PM1. Thus, the semiconductor device IC can maintain the terminal voltages of the capacitors C1 to C5 within the predetermined value.

Figure 3:
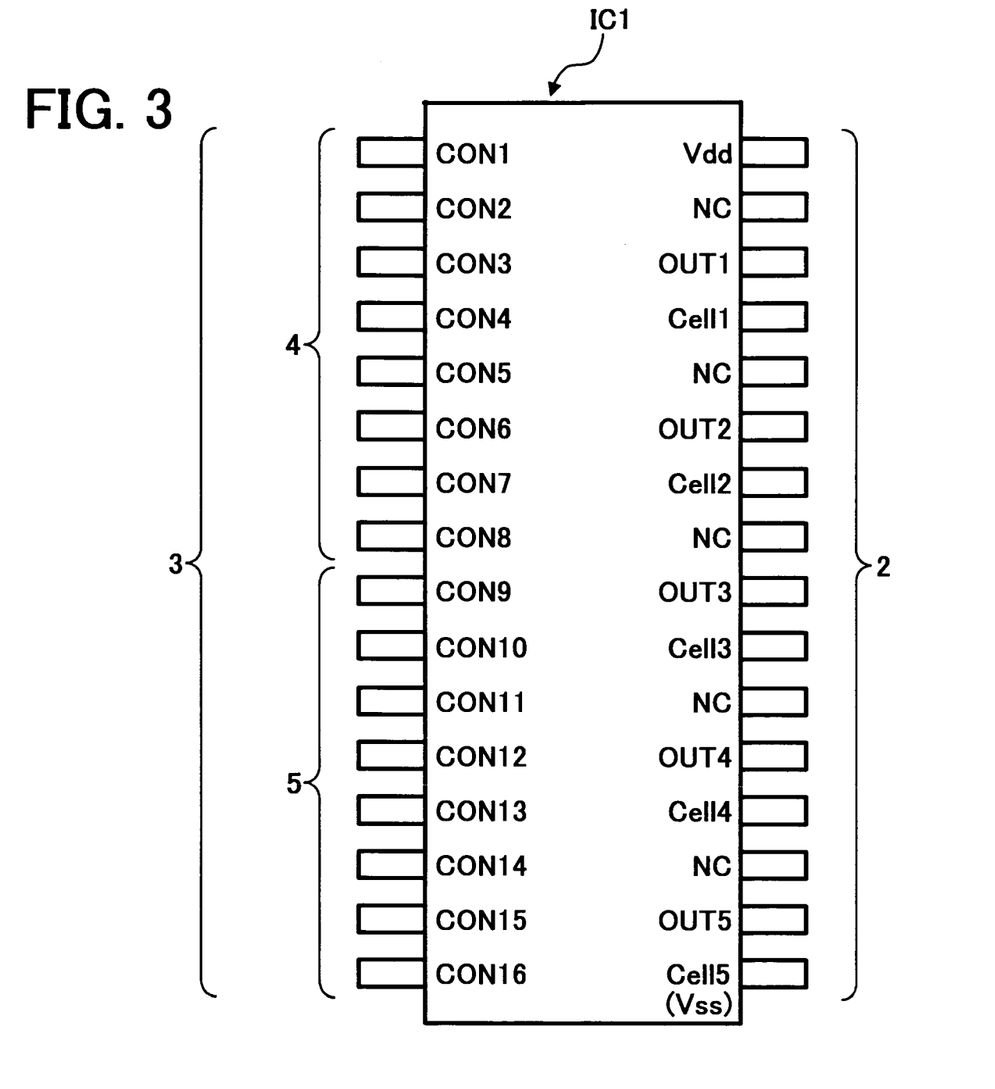

Referring now to FIG. 3, an exemplary terminal arrangement of the semiconductor device IC is explained. For descriptive purposes, the semiconductor device IC, having the terminal arrangement of FIG. 3, is hereafter referred to as the semiconductor device IC1.

As shown in FIG. 3, the semiconductor device IC1 includes a plurality of terminals, which may be classified into two terminal groups, including a capacitor-side terminal group 2 and a control terminal group 3.

The capacitor-side terminal group 2, arranged at the side facing the capacitors C1 to C5, functions as a connector connecting the semiconductor device IC1 to the transistors TR1 to TR5 and to the capacitors C1 to C5. The capacitor-side terminal group 2 includes a positive supply terminal Vdd at the high voltage side, a negative supply terminal Vss at the low voltage side, and other terminals between the positive and negative supply terminals Vdd and Vss. The other terminals specifically include non-connected terminals NC, transistor terminals OUT1 to OUT5, and capacitor terminals Cell1 to Cell5.

As mentioned above referring to FIG. 2, the positive supply terminal Vdd is connected to a positive voltage supply source of the system, and to the positive terminal of the capacitor C1. The transistor terminal OUT1 is connected to the base of the transistor TR1, and to the output terminal of the comparator CMP1. The capacitor terminal Cell1 is connected to the negative terminal of the capacitor C1, and to the positive terminal of a capacitor C2.

Further, the transistor terminal OUT2 is connected to the base of a transistor TR2 (FIG. 2), and to the transistor terminal of a comparator CMP2 (FIG. 2). The capacitor terminal Cell2 is connected to the negative terminal of the capacitor C2, and to the positive terminal of a capacitor C3.

Although not shown, the transistor terminals OUT3, OUT4, and OUT5 and the capacitor terminals Cell3, Cell4, and Cell5, of the parallel monitor circuits PM3, PM4, and PM5, respectively, are connected to corresponding terminals, in a similar manner as described above. In other words, the respective transistor terminals OUT1 to OUT5, which are connected to the corresponding transistors TR1 to TR5, are placed between the corresponding capacitor terminals Cell1 to Cell5, which are connected to the respective capacitors C1 to C5.

In this case, however, the capacitor terminal Cell5 functions as the negative supply terminal Vss, which is connected to a negative voltage supply source of the system, preferably the ground. Further, the non-connected terminals NC, which are connected to none of the terminals, are provided to make the configuration of the semiconductor device IC1 symmetric. The symmetric configuration corresponds to the circuit configuration having the same number of terminals on both sides of the capacitor-side terminal group 2 and the control terminal group 3.

The control terminal group 3, arranged at the side of the semiconductor device IC1, facing away from the capacitors C1 to C5, functions as a controller controlling the operation of the semiconductor device IC1. The control terminal group 3 includes a high voltage terminal group 4 at the high voltage side and a low voltage terminal group 5 at the low voltage side.

The high voltage terminal group 4 includes high voltage connector terminals CON1 to CON8, which are connected respectively to the positive voltage supply source of the system. The low voltage terminal group 5 includes low voltage connector terminals CON9 to CON16, which are connected respectively to the negative voltage supply source of the system.

In operation, the semiconductor device IC1 receives a voltage from the positive voltage supply source through the respective connector terminals CON1 to CON8. The comparators CMP1 to CMP5 compare the detected terminal voltages V1 to V5 developed across the capacitors C1 to C5, respectively, with the predetermined value defined by the reference voltages Vr1 to Vr5. The semiconductor device IC1 outputs alarm signals, indicating the comparison results, to the outside of the system through the respective connector terminals CON9 to CON16. Subsequently, the semiconductor device IC1 receives control signals corresponding to the comparison results from outside of the system, through the respective connector terminals CON9 to CON16. During this operation, the semiconductor device IC1 controls the voltages of the capacitors C1 to C5 at the same level.

In this exemplary case shown in FIG. 3, the capacitor-side terminal group 2 is arranged at the right side, while the control terminal group 3 is arranged at the left side. However, the capacitor side terminal group 2 may be arranged at any side other than the right side, as long as it faces toward the capacitors. Accordingly, the control terminal group 3 may be arranged at any side other than the left side, as long as it opposes the capacitor side terminal group 2.

Further, in FIG. 3, the high voltage side is arranged at the upper portion, while the low voltage side is arranged at the lower portion. However, the high voltage side may be arranged at any portion, as long as it faces toward the positive voltage supply source. Accordingly, the low voltage side may be arranged at any portion, as long as it faces toward the negative voltage supply source.

Furthermore, the semiconductor device IC1 of FIG. 3 can monitor the voltages of five capacitors, however, one or more semiconductor devices IC1 may be serially connected to monitor the voltages of more than five capacitors.

Figure 4A:
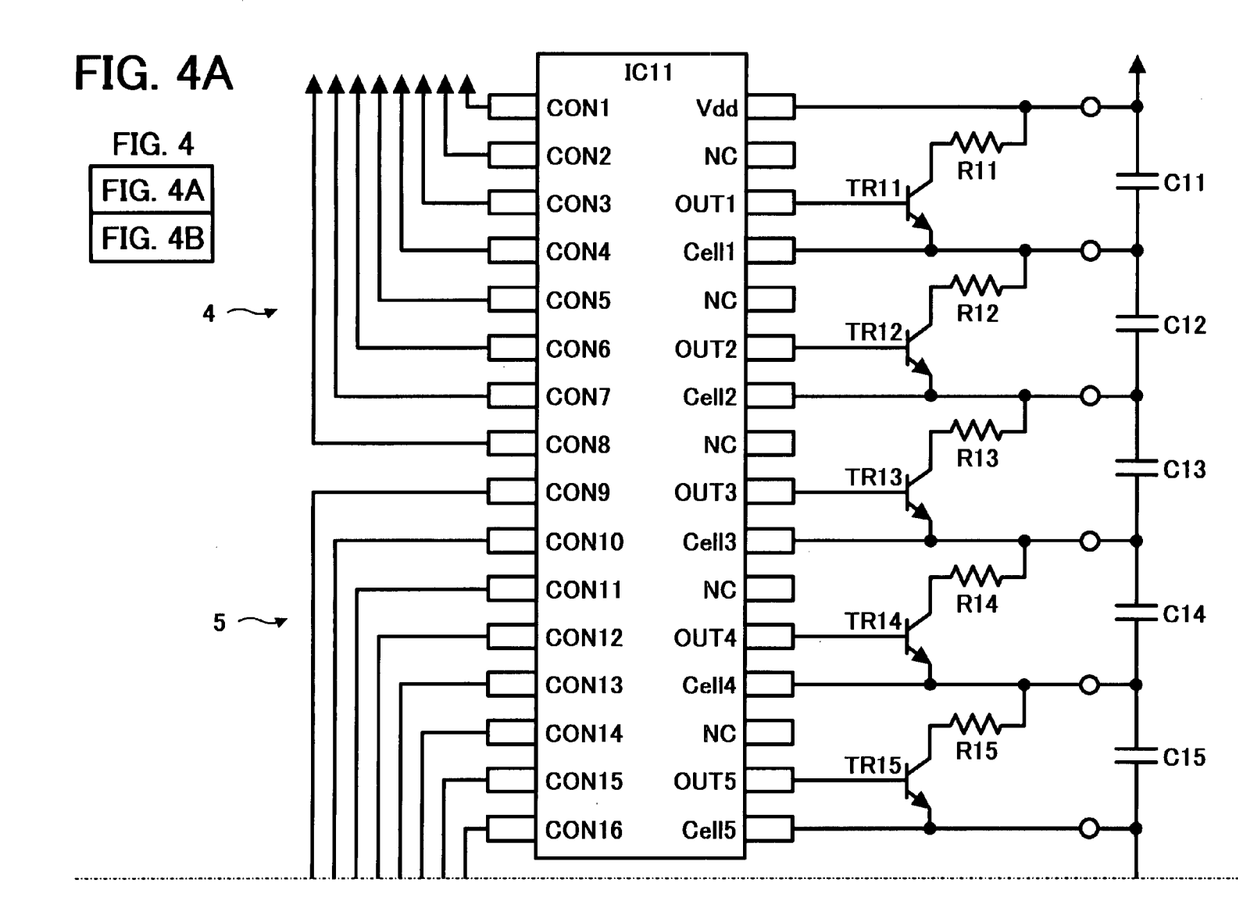
Figure 4B:
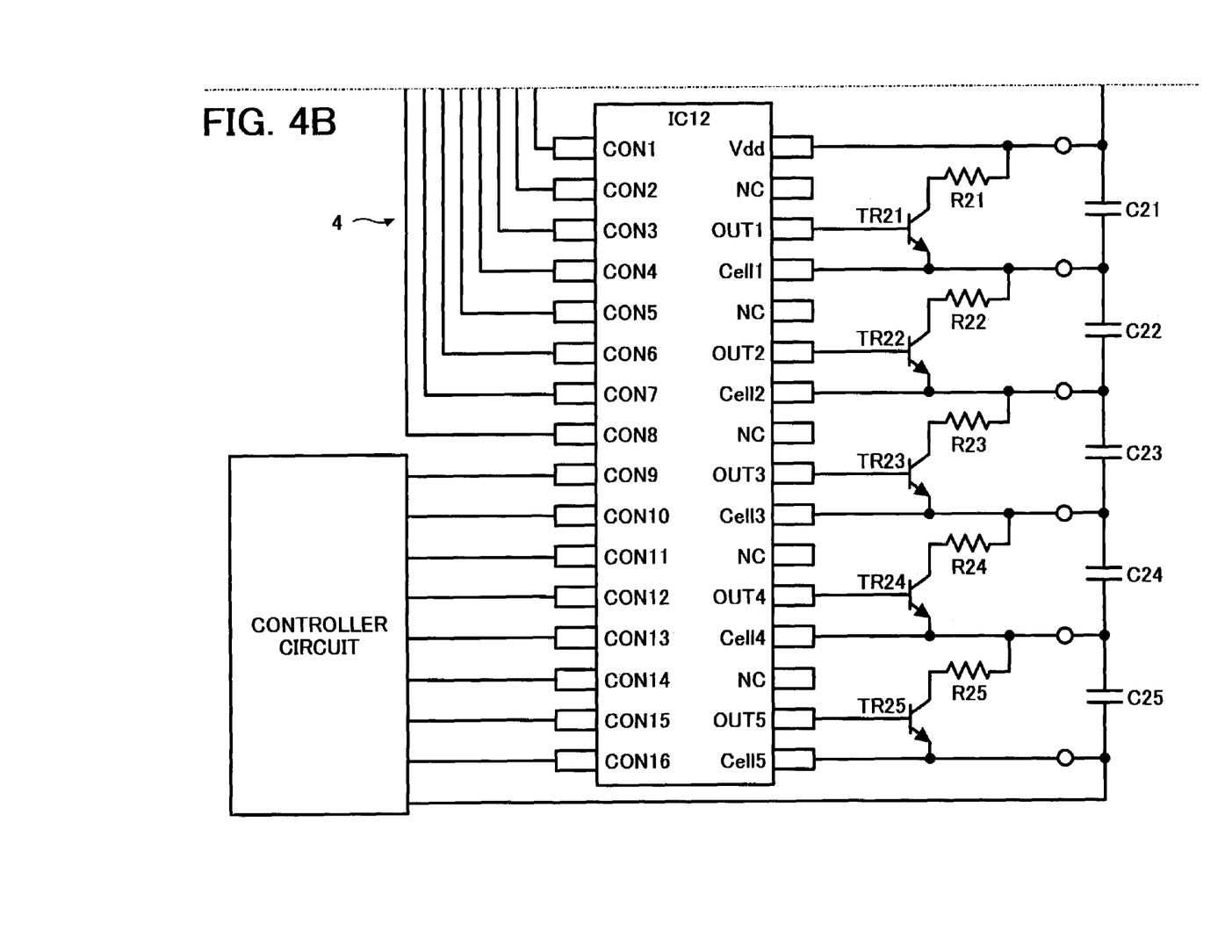

FIGS. 4A and 4B illustrate an exemplary case of monitoring the voltages of ten capacitors C11 to C25, by serially connecting two semiconductor devices IC1, IC1. For the descriptive purposes, the semiconductor device IC1 placed at the high voltage side is referred to as the first semiconductor device IC11, and the semiconductor device IC1 placed at the low voltage side is referred to as the second semiconductor device IC12. In this exemplary case, resistors R11 to R25 are additionally provided for the capacitors C11 to C25. However, the operations of the semiconductor devices IC11 and IC12 are substantially the same with the operation of the semiconductor device IC1.

The positive supply terminal Vdd of the first semiconductor device IC11 is connected to a capacitor C11, and to one terminal of the resistor R11. The other terminal of the resistor R11 is connected to the collector of a transistor TR11. The transistor terminal OUT1 is connected to the base terminal of the transistor TR11. The capacitor terminal Cell1 is connected to the emitter of the transistor TR11, and to the capacitor C11. The capacitance terminal Cell5 is connected to the positive supply terminal Vdd of the second semiconductor device IC12.

The high voltage terminal group 4, including the connector terminals CON1 to CON8, of the first semiconductor device IC11 is connected to the positive voltage supply source of the system. The low voltage terminal group 5, including the connector terminals CON9 to CON16, of the first semiconductor device IC11 is connected to the high voltage terminal group 4, including the connector terminals CON1 to CON8, of the second semiconductor device IC12. The low voltage terminal group 5, including the connector terminals CON9 to CON16, of the second semiconductor device IC12, is connected to a controller circuit. The controller circuit includes a CPU (central processing unit), for example, capable of controlling an operation of the first and second semiconductor devices IC11 and IC12.

To simplify the circuit configuration of the system, the connector terminals CON10 to CON16 of the first semiconductor device IC11 are connected to the corresponding connector terminals CON1 to CON8 of the second semiconductor device IC12, from the inner side toward the outer side, when viewed from the position between the semiconductor devices IC11 and IC12.

More specifically, as shown in FIGS. 4A and 4B, the connector terminal CON16 of the first semiconductor device IC11, which is placed at the lowest voltage side, is connected to the connector terminal CON1 of the second semiconductor device IC12, which is placed at the highest voltage side. In a similar manner, the connector terminal CON15 of the first semiconductor device IC11, which is placed at the secondly lowest voltage side, is connected to the connector terminal CON2 of the second semiconductor device IC12, which is placed at the secondly highest voltage side. In a similar manner, the connector terminal CON10 of the first semiconductor device IC11, which is placed at the highest voltage side, is connected to the connector terminal CON8 of the second semiconductor device IC12, which is placed at the lowest voltage side.

FIGS. 4A and 4B illustrate the exemplary case of serially connecting two semiconductor devices IC1, however, more than two semiconductor devices IC1 may be serially connected, as mentioned above. In such a case, the high voltage terminal group 4 of the first semiconductor device IC11 may be connected to the low voltage terminal group 5 of another serially-connected semiconductor device IC1, positioned at the higher voltage side. Further, the low voltage terminal group 5 of the second semiconductor device IC12 may be connected to the high voltage terminal group 4 of another serially-connected semiconductor device IC1, positioned at the lower voltage side. The controller circuit is preferably connected to the semiconductor device IC1, positioned at the lowest voltage side, i.e., the ground having 0 volts.

Figure 5:
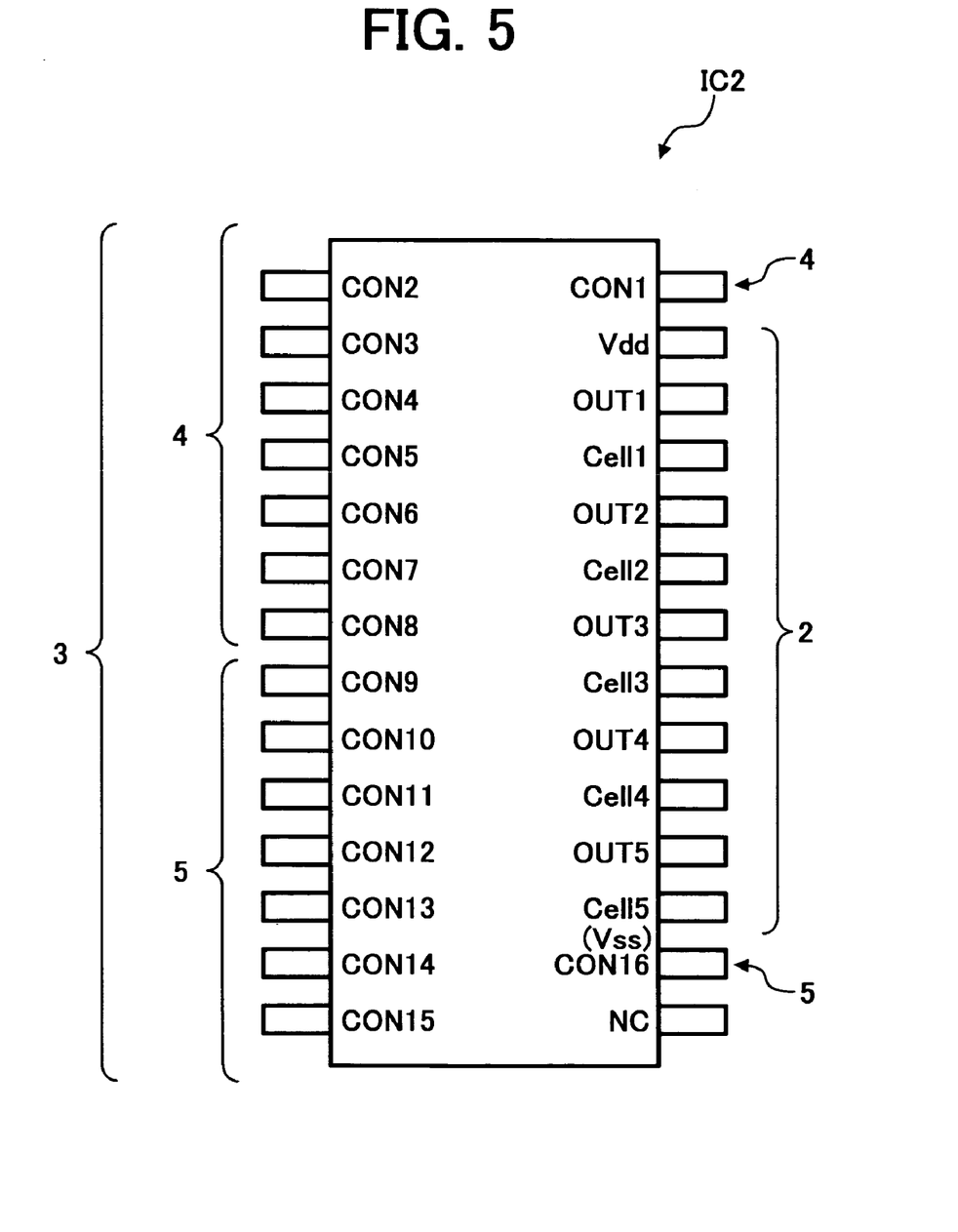

A to the terminal arrangement shown in FIG. 3, the semiconductor device IC of FIG. 2 may be formed with a terminal arrangement shown in FIG. 5, for example. For the descriptive purposes, the semiconductor device IC having the terminal arrangement of FIG. 5 is referred to as the semiconductor device IC2.

Compared to the semiconductor device IC1, a part of the control terminal group 3 of the semiconductor device IC2 is moved to the capacitor side. In particular, as shown in FIG. 5, the terminal CON1 of the high voltage terminal group 4 is now arranged at the capacitor side, right above the positive supply terminal Vdd. Further, the terminal CON16 of the low voltage terminal group 5 is now arranged at the capacitor side, right below the negative supply terminal Vss. In this way, the number of non-connected terminals NC, which are provided only to keep the symmetric structure, may be reduced to one. As a result, the semiconductor device IC2 has only one non-connected terminal NC at the low voltage side.

FIG. 5 illustrates the exemplary case of moving two connector terminals to the capacitor side, however, the number of moved connector terminals depends on the structure, i.e., the number of terminals present in the capacitor-side terminal group 2, of the semiconductor device IC2.

To effectively determine the number of connector terminals to be moved to the capacitor side, the terminals belonging to the capacitor-side terminal group 2 are firstly arranged at the capacitor side, preferably in order from the high voltage side to the low voltage side. The connector terminals of the control terminal group 3 are then arranged at the side opposing the capacitor side, preferably in order from the high voltage side to the low voltage side. If the number of the connector terminals of the control terminal group 3 is greater than that of the number of the terminals of the capacitor-side terminal group 2, a desired number of connector terminal pairs is moved to the capacitor side. In this case, a pair of the connector terminal placed at the highest voltage side and the connector terminal placed at the lowest voltage side is selected first.

Figure 6A:
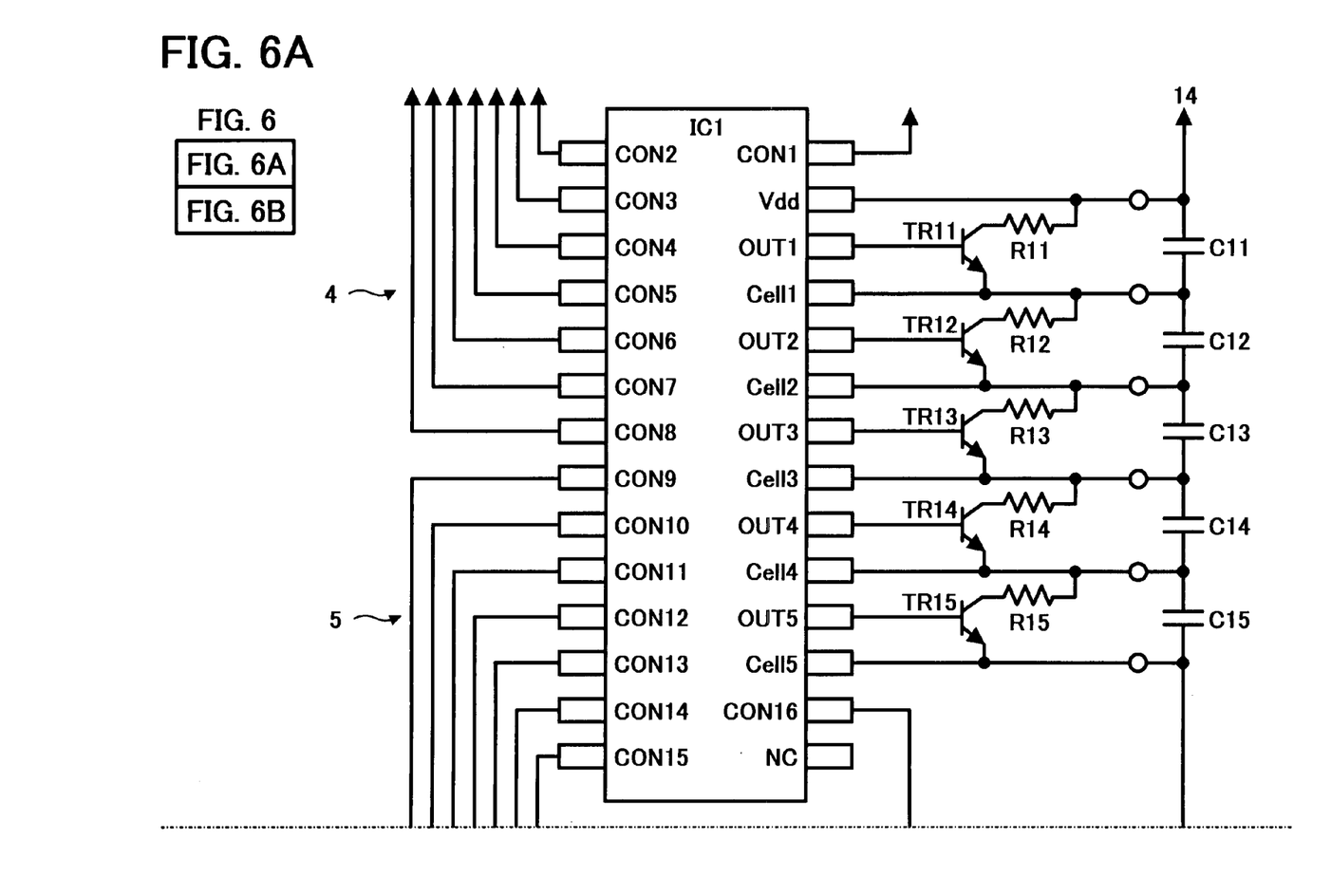
Figure 6B:
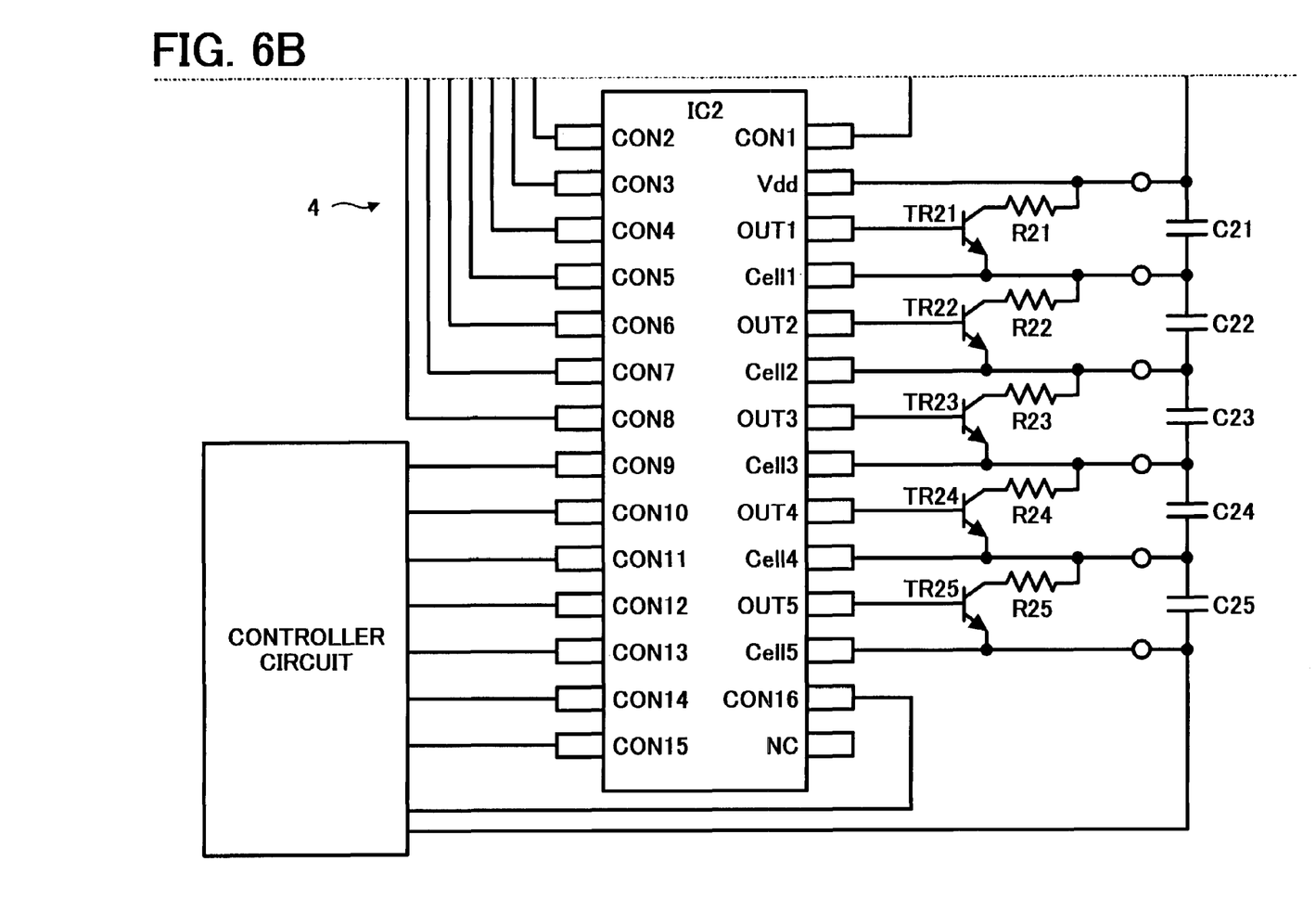

FIGS. 6A and 6B illustrate an exemplary case of monitoring the voltages of ten capacitors C11 to C25, by serially connecting two semiconductor devices IC2, IC2. Although the terminal arrangement of the semiconductor device IC2 differs from that of the semiconductor device IC1, the terminal connections of FIGS. 6A and 6B are substantially the same as the terminal connections of FIGS. 4A and 4B.

Figure 7:
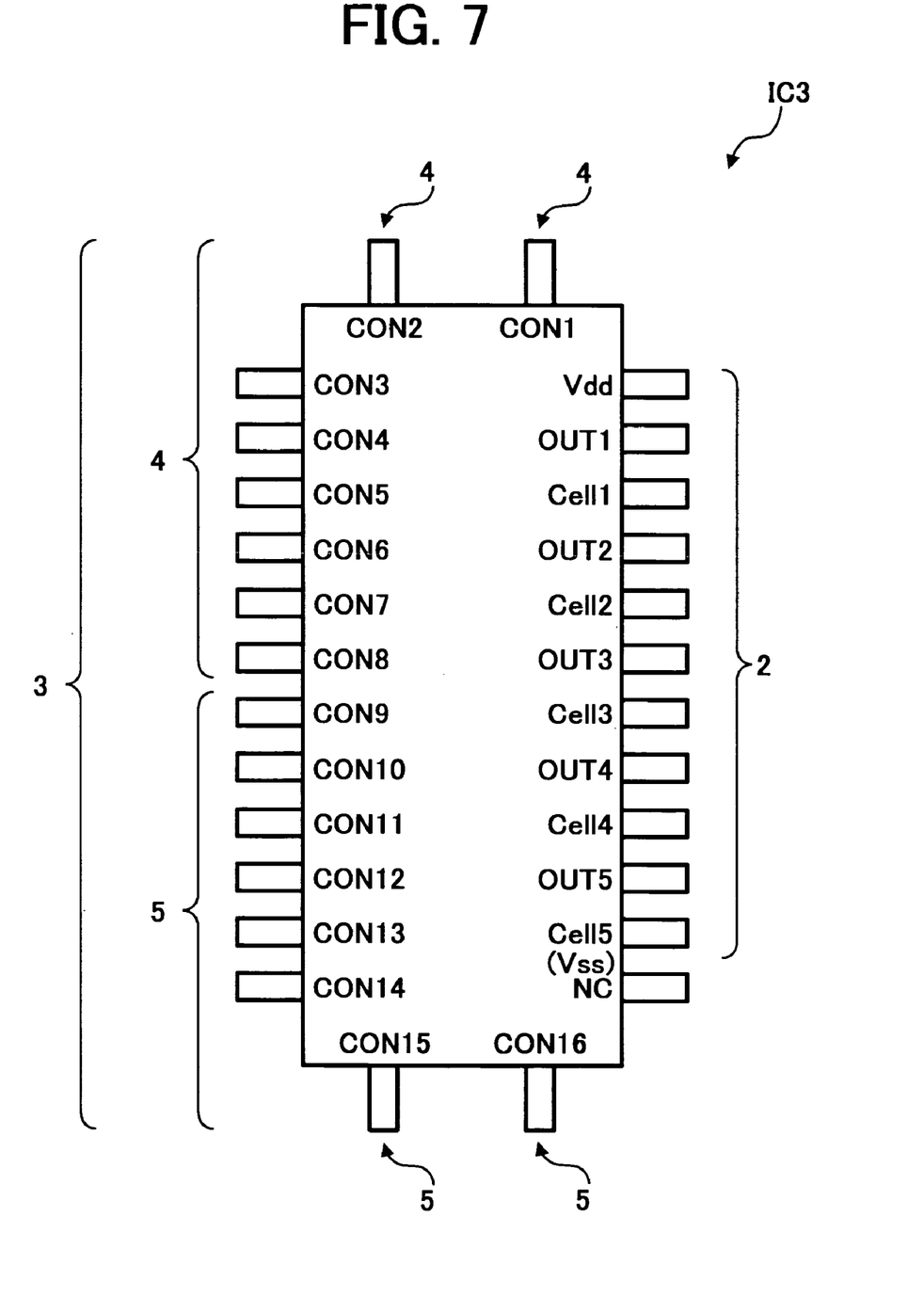

In alternative to the terminal arrangement shown in FIG. 3 or 5, the semiconductor device IC of FIG. 2 may be formed with a terminal arrangement shown in FIG. 7, for example. For the descriptive purposes, the semiconductor device IC having the terminal arrangement of FIG. 7 is referred to as the semiconductor device IC3.

Compared to the semiconductor device IC1, a part of the control terminal group 3 of the semiconductor device IC3 is moved to the sides perpendicular to the capacitor side. In particular, as shown in FIG. 7, the connector terminals CON1 and CON2 of the high voltage terminal group 4 are now arranged at the side toward the high voltage side. Further, the connector terminals CON15 and CON16 of the low voltage terminal group 5 are now arranged at the side toward the low voltage side. In this way, the number of terminals NC may be reduced to one, as in the case of the semiconductor device IC2 of FIG. 5.

FIG. 7 illustrates the exemplary case of moving four connector terminals to the sides perpendicular to the capacitor side, however, the number of moved connector terminals depends on the structure, i.e., the number of terminals present in the capacitor-side terminal group 2, of the semiconductor device IC3.

To effectively determine the number of connector terminals to be moved to the sides perpendicular to the capacitor side, the terminals of the capacitor-side terminal group 2 is firstly arranged at the capacitor side, preferably in order from the high voltage side to the low voltage side. The connector terminals of the control terminal group 3 are then arranged at the side opposing the capacitor side, preferably in order from the high voltage side to the low voltage side. If the number of the connector terminals of the control terminal group 3 is greater than that of the number of the terminals of the capacitor-side terminal group 2, a desired number of connector terminal pairs is moved to either of the sides perpendicular to the capacitor side. In this case, a pair of the connector terminal placed at the highest voltage side and the connector terminal placed at the lowest voltage side is selected first. Further, the connector terminal of the high voltage terminal group 4 is preferably moved to the side toward the high voltage side, while the connector terminal of the low voltage terminal group 5 is preferably moved to the side toward the low voltage side.

Although not shown, one or more semiconductor devices IC3 of FIG. 7 may be serially connected depending on the number of capacitors. Even in such a case, the terminal connections are substantially the same as the terminal connections of FIGS. 4A and 4B.

In addition to the above-described terminal arrangements, the semiconductor device of FIG. 2 may be formed with other terminal arrangements, depending on the type of packaging being applied. Examples of such packaging methods include any type of lead insertion, surface mounting, or socketing methods, including DIP (Dual Inline Package), QUIP (Quad Inline Package), PGA (Pin Grin Array), SOP (Small Outline Package), QFP (Quad Flat Package), QFJ (Quad Flat J-lead Pagakge), BGA (Ball Grid Array), and CSP (Chip Size Pagakge).

Thus, in some exemplary cases, the capacitor-side terminal group 4 may be distributed on the capacitor side surface, rather than being arranged in the capacitor side. Similarly, the control terminal group 3 may be distributed on the side surface opposing the capacitor side surface, rather than being arranged in the side opposing the capacitor side.

As mentioned above, one or more semiconductor devices may be serially connected to monitor the voltages of the corresponding number of capacitors. In such a case, alarm signals and control signals are transmitted between the serially-connected semiconductor devices that are adjacent to each other.

Figure 8:
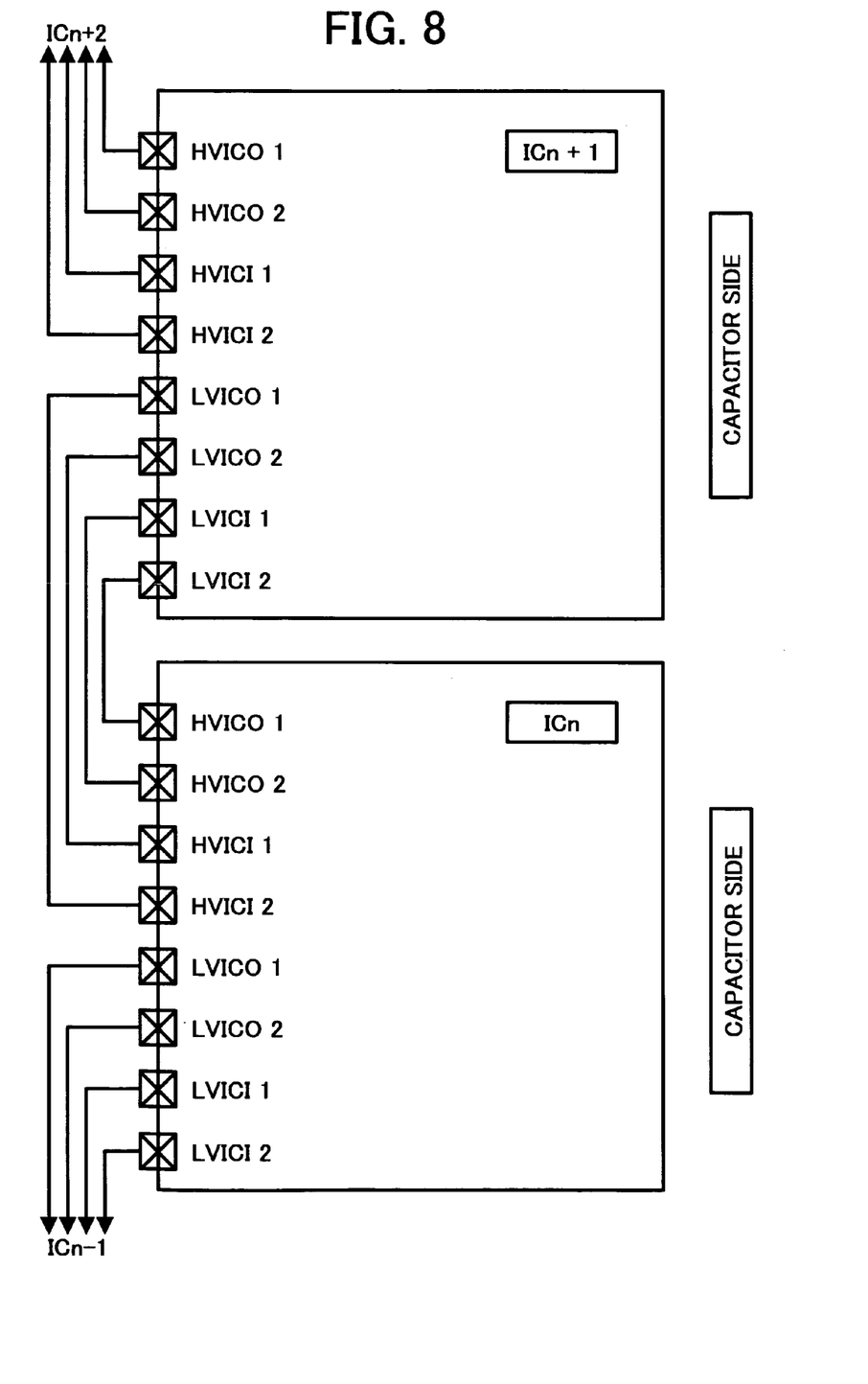
Figure 9A:
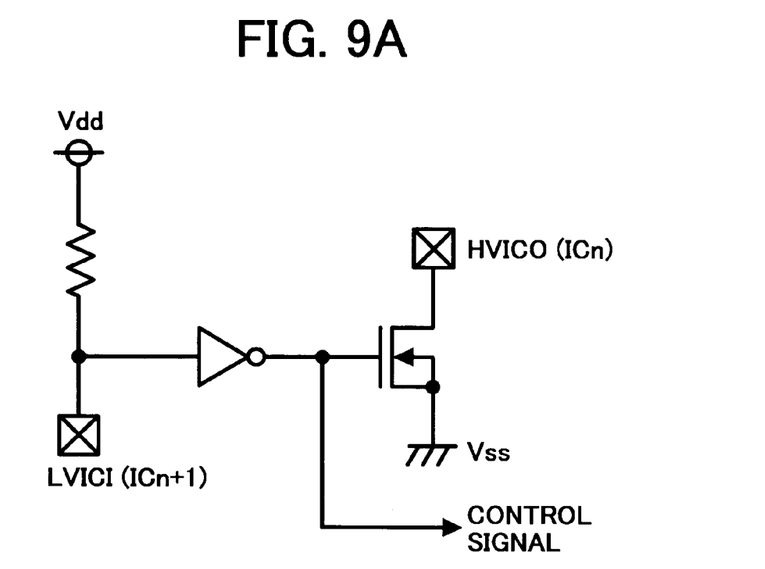
Figure 9B:
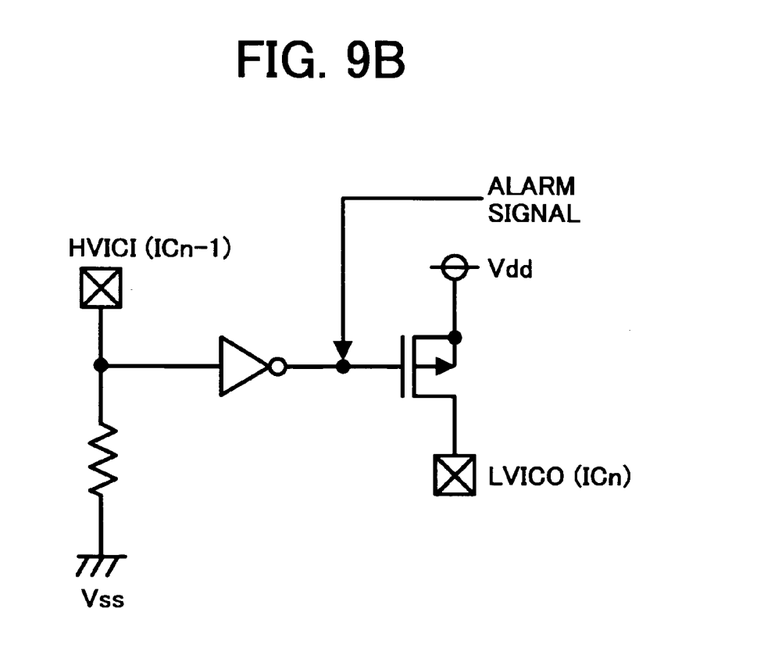

Referring now to FIGS. 8, 9A, and 9B, an exemplary operation of transmitting alarm and control signals is explained.

The system shown in FIG. 8 includes a plurality of semiconductor devices IC0, IC1, . . . ICn−1, ICn, ICn+1, ICn+2 . . . , ICv, which are serially connected. Each of the semiconductor devices may be formed with any one of the above-described and other terminal arrangements of the present invention. The semiconductor device IC0 (not shown) is connected to a controller circuit (not shown) placed at the ground. The semiconductor device ICv (not shown) is connected to the positive voltage supply of the system. Between the semiconductor devices ICv and IC0, the semiconductor devices, including ICn and ICn+1 of FIG. 8, are arranged in order from the high voltage side to the low voltage side.

As shown in FIG. 8, the semiconductor device ICn includes four kinds of connector terminal pairs, including a high voltage output terminal pair HVIC0, a high voltage input terminal pair HVICI, a low voltage output terminal pair LVIC0, and a low voltage input terminal pair LVICI. The high voltage input terminal pair HVIC0 (including HVIC01 and HVIC02) functions as an output terminal, capable of outputting a control signal, received originally from the controller circuit, to the semiconductor device ICn+1. The high voltage input terminal pair HVICI (including HVICI1 and HVICI2) functions as an input terminal, capable of receiving an alarm signal, received from the semiconductor device ICn+1. The low voltage output terminal pair LVIC0 (including LVIC01 and LVIC02) functions as an output terminal, capable of outputting an alarm signal, indicating the terminal voltages of the corresponding capacitors detected by the semiconductor device ICn, to the semiconductor device ICn−1. The low voltage input terminal pair LVICI (including LVICI1 and LVICI2) functions as an input terminal, capable of receiving a control signal, generated originally by the controller circuit, from the semiconductor device ICn−1.

Any other semiconductor device existing in the system has a structure substantially the same as that of the semiconductor device ICn.

Referring now to FIG. 9A, an exemplary operation of transmitting a control signal to the semiconductor device ICn+1, performed by the semiconductor device ICn, is explained. More specifically, the semiconductor device ICn outputs the control signal through the high voltage input terminal HVIC0, to the semiconductor device ICn+1 through the low voltage input terminal LVICI.

As shown in FIG. 9A, the high voltage output terminal HVIC0 of the semiconductor device ICn has an N-channel, open drain output structure, provided with a pull-up resistor R. The low voltage input terminal LVICI of the semiconductor device ICn+1 is connected to one terminal of the pull-up resistor R, which is connected to the positive voltage supply source Vdd.

When the high voltage output terminal HVIC0 is turned on, the output voltage of the output terminal HVIC0 becomes substantially equal to the voltage of the negative voltage supply source Vss. As a result, the low signal is input to the low voltage input terminal LVICI of the semiconductor device ICn+1.

When the high voltage output terminal HVIC0 is turned off, the output voltage of the output terminal HVIC0 becomes substantially equal to the voltage of the positive voltage supply source Vdd. As a result, the high signal is input to the low voltage input terminal LVICI of the semiconductor device ICn+1.

Referring now to FIG. 9B, an exemplary operation of transmitting an alarm signal to the semiconductor device ICn−1, performed by the semiconductor device ICn, is explained. More specifically, the semiconductor device ICn outputs the alarm signal through the low voltage output terminal LVIC0, to the semiconductor device ICn−1 through the high voltage input terminal HVICI.

As shown in FIG. 9B, the low voltage output terminal LVIC0 of the semiconductor device ICn has a P-channel, open drain output structure, provided with a pull-up resistor R. The high voltage input terminal HVICI of the semiconductor device ICn−1 is connected to one terminal of the pull-up resistor R, which is connected to the negative voltage supply source Vss.

When the low voltage output terminal LVIC0 is turned on, the output voltage of the output terminal LVIC0 becomes substantially equal to the voltage of the positive voltage supply source Vdd. As a result, the high signal is input to the high voltage input terminal HVICI of the semiconductor device ICn−1.

When the low voltage output terminal LVIC0 is turned off, the output voltage of the output terminal LVIC0 becomes substantially equal to the voltage of the negative voltage supply source Vss. As a result, the low signal is input to the high voltage input terminal HVICI of the semiconductor device ICn−1.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. 2003-380722 filed on Nov. 11, 2003, in the Japanese Patent Office, the entire contents of which are incorporated by reference herein.

What is claimed as new and desired to be protected by Letters Patent of the united states is:

1. A semiconductor device, comprising:
   a plurality of serially-connected parallel monitor circuits, respectively connected in parallel to a plurality of serially-connected capacitors and to a plurality of serially-connected transistors, each monitor circuit including:
   one or more capacitor terminals distributed on a first side surface of the semiconductor device and configured to connect each monitor circuit to corresponding one of the capacitors; and
   a transistor terminal distributed on the first side surface of the semiconductor device and configured to connect each monitor circuit to corresponding one of the transistors.

2. The semiconductor device of claim 1, wherein the first side surface faces the capacitors.

3. The semiconductor device of claim 1, wherein the capacitors are arranged in order from a high voltage side having a positive voltage supply source, to a low voltage side having a negative voltage supply source.

4. The semiconductor device of claim 3, wherein the parallel monitor circuits are arranged in order from the high voltage side to the low voltage side, according to the arrangement of the capacitors.

5. The semiconductor device of claim 4, wherein the one or more capacitor terminals and the transistor terminal are arranged in a predetermined order.

6. The semiconductor device of claim 5, wherein the transistor terminal is arranged next to the one or more capacitor terminals.

7. The semiconductor device of claim 4, wherein each monitor circuit further includes:
   one or more high voltage connector terminals distributed on a second side surface of the semiconductor device, near the high voltage side, and configured to connect the semiconductor device directly or indirectly to the positive voltage supply source; and
   one or more low voltage connector terminals distributed on the second side surface of the semiconductor device, near the low voltage side, and configured to connect the semiconductor device directly or indirectly to the negative voltage supply source.

8. The semiconductor device of claim 7, wherein the one or more high voltage connector terminals include a high voltage input terminal and a high voltage output terminal, and the one or more low voltage connector terminals include a low voltage input terminal and a low voltage output terminal.

9. The semiconductor device of claim 8, wherein the low voltage input terminal receives a first control signal from the outside, and the high voltage output terminal sends a second control signal generated based on the first control signal to the outside.

10. The semiconductor device of claim 9, wherein the high voltage input terminal receives a first alarm signal from the outside, and the low voltage output signal sends a second alarm signal generated based on the first alarm signal to the outside.

11. The semiconductor device of claim 7, wherein the second side surface includes a side surface opposite to the first side surface.

12. The semiconductor device of claim 7, wherein the second side surface further includes the first side surface.

13. The semiconductor device of claim 7, wherein the second side surface further includes a side surface perpendicular to the first side surface.

14. The semiconductor device of claim 7, wherein the low voltage connector terminals are respectively connected in order from the low voltage side to the high voltage side, to terminals of another semiconductor device.

15. The semiconductor device of claim 1, wherein the capacitor terminals and transistor terminals are arranged on a first side of the semiconductor device.

16. The semiconductor device of claim 15, wherein the first side faces the capacitors.

17. The semiconductor device of claim 15, wherein the capacitors are arranged in order from a high voltage side having a positive voltage supply source, to a low voltage side having a negative voltage supply source.

18. The semiconductor device of claim 17, wherein the parallel monitor circuits are arranged in order from the high voltage side to the low voltage side, according to the arrangement of the capacitors.

19. The semiconductor device of claim 18, wherein the one or more capacitor terminals and the transistor terminal are arranged in a predetermined order.

20. The semiconductor device of claim 19, wherein the transistor terminal is arranged next to the one or more capacitor terminals.

21. The semiconductor device of claim 18, wherein the parallel monitor circuits are further connected to the positive voltage supply source and to the negative voltage supply source.

22. The semiconductor device of claim 21, wherein each monitor circuit further includes:
   one or more high voltage connector terminals arranged on a second side of the semiconductor device, near the high voltage side, and configured to connect the semiconductor device to the positive voltage supply source; and
   one or more low voltage connector terminals arranged on the second side of the semiconductor device, near the low voltage side, and configured to connect the semiconductor device to the negative voltage supply source.

23. The semiconductor device of claim 22, wherein the one or more high voltage connector terminals include a high voltage input terminal and a high voltage output terminal, and the one or more low voltage connector terminals include a low voltage input terminal and a low voltage output terminal.

24. The semiconductor device of claim 23, wherein the low voltage input terminal receives a first control signal from the outside, and the high voltage output terminal sends a second control signal generated based on the first control signal to the outside.

25. The semiconductor device of claim 24, wherein the high voltage input terminal receives a first alarm signal from the outside, and the low voltage output signal sends a second alarm signal generated based on the first alarm signal to the outside.

26. The semiconductor device of claim 21, wherein the second side includes a side opposite to the first side.

27. The semiconductor device of claim 21, wherein the second side further includes the first side.

28. The semiconductor device of claim 21, wherein the second side further includes a side perpendicular to the first side.

29. The semiconductor device of claim 18, wherein the parallel monitor circuits are further connected to the positive voltage supply source, and to a low voltage semiconductor device arranged in the low voltage side of the semiconductor device.

30. The semiconductor device of claim 29, wherein each monitor circuit further includes:
one or more high voltage connector terminals arranged on a second side of the semiconductor device, near the high voltage side and configured to connect the semiconductor device to the positive voltage supply source; and
one or more low voltage connector terminals arranged on the second side of the semiconductor device, near the low voltage side, and configured to connect the semiconductor device to terminals of the low voltage semiconductor device.

31. The semiconductor device of claim 30, wherein the one or more high voltage connector terminals include a high voltage input terminal and a high voltage output terminal, and the one or more low voltage connector terminals include a low voltage input terminal and a low voltage output terminal.

32. The semiconductor device of claim 31, wherein the low voltage input terminal receives a first control signal from the low voltage semiconductor device, and the high voltage output terminal sends a second control signal generated based on the first control signal to the outside.

33. The semiconductor device of claim 32, wherein the high voltage input terminal receives a first alarm signal from the outside, and the low voltage output signal sends a second alarm signal generated based on the first alarm signal to the low voltage semiconductor device.

34. The semiconductor device of claim 30, wherein the low voltage connector terminals are respectively connected in order from the low voltage side to the high voltage side, to the terminals of the low voltage semiconductor device from the high voltage side to the low voltage side.

35. The semiconductor device of claim 30, wherein the second side includes a side opposite to the first side.

36. The semiconductor device of claim 30, wherein the second side further includes the first side.

37. The semiconductor device of claim 30, wherein the second side further includes a side perpendicular to the first side.

38. The semiconductor device of claim 18, wherein the parallel monitor circuits are further connected to the negative voltage supply source, and to a high voltage semiconductor device arranged in the high voltage side of the semiconductor device.

39. The semiconductor device of claim 38, wherein each monitor circuit further includes:
one or more high voltage connector terminals arranged on a second side of the semiconductor device, near the high voltage side and configured to connect the semiconductor device to terminals of the high voltage semiconductor device; and
one or more low voltage connector terminals arranged on the second side of the semiconductor device, near the low voltage side and configured to connect the semiconductor device to the negative voltage supply source.

40. The semiconductor device of claim 39, wherein the one or more high voltage connector terminals include a high voltage input terminal and a high voltage output terminal, and the one or more low voltage connector terminals include a low voltage input terminal and a low voltage output terminal.

41. The semiconductor device of claim 40, wherein the low voltage input terminal receives a first control signal from the outside, and the high voltage output terminal sends a second control signal generated based on the first control signal to the high voltage semiconductor device.

42. The semiconductor device of claim 41, wherein the high voltage input terminal receives a first alarm signal from the high voltage semiconductor device, and the low voltage output signal sends a second alarm signal generated based on the first alarm signal to the outside.

43. The semiconductor device of claim 39, wherein the high voltage connector terminals are respectively connected in order from the high voltage side to the low voltage side, to the terminals of the high voltage semiconductor device from the low voltage side to the high voltage side.

44. The semiconductor device of claim 39, wherein the second side includes a side opposite to the first side.

45. The semiconductor device of claim 39, wherein the second side further includes the first side.

46. The semiconductor device of claim 39, wherein the second side further includes a side perpendicular to the first side.

47. The semiconductor device of claim 18, wherein the parallel monitor circuits are further connected to a high voltage semiconductor device arranged in the high voltage side of the semiconductor device, and to a low voltage semiconductor device arranged in the low voltage side of the semiconductor device.

48. The semiconductor device of claim 47, wherein each monitor circuit further includes:
one or more high voltage connector terminals arranged on a second side of the semiconductor device, near the high voltage side, and configured to connect the semiconductor device to terminals of the high voltage semiconductor device; and
one or more low voltage connector terminals arranged on the second side of the semiconductor device, near the low voltage side, and configured to connect the semiconductor device to terminals of the low voltage semiconductor device.

49. The semiconductor device of claim 48, wherein the one or more high voltage connector terminals include a high voltage input terminal and a high voltage output terminal, and the one or more low voltage connector terminals include a low voltage input terminal and a low voltage output terminal.

50. The semiconductor device of claim 49, wherein the low voltage input terminal receives a first control signal from the low voltage semiconductor device, and the high voltage output terminal sends a second control signal generated based on the first control signal to the high voltage semiconductor device.

51. The semiconductor device of claim 50, wherein the high voltage input terminal receives a first alarm signal from the high voltage semiconductor device, and the low voltage output signal sends a second alarm signal generated based on the first alarm signal to the low voltage semiconductor device.

52. The semiconductor device of claim 48,
wherein the high voltage connector terminals are respectively connected in order from the high voltage side to the low voltage side, to the terminals of the high voltage semiconductor device from the low voltage side to the high voltage side, and
wherein the low voltage connector terminals are respectively connected in order from the low voltage side to the high voltage side, to the terminals of the low voltage semiconductor device from the high voltage side to the low voltage side.

53. The semiconductor device of claim 48, wherein the second side includes a side opposite to the first side.

54. The semiconductor device of claim 48, wherein the second side further includes the first side.

55. The semiconductor device of claim 48, wherein the second side further includes a side perpendicular to the first side.

56. A terminal arrangement method, comprising the steps of:
distributing a plurality of capacitor terminals on a first side surface of a semiconductor device; and
distributing a plurality of transistor terminals on the first side surface of the semiconductor device.

57. The method of claim 56, further comprising the step of:
arranging the capacitor terminals and transistor terminals in order from a high voltage side to a low voltage side.

58. The method of claim 57, further comprising the step of:
arranging the capacitor terminals and the transistor terminals in a predetermined order.

59. The method of claim 58, wherein the transistor terminals are arranged next to the capacitor terminals.

60. The method of claim 57, further comprising the steps of:
distributing a plurality of high voltage connector terminals on a second side surface opposite to the first side surface of the semiconductor device, near the high voltage side; and
distributing a plurality of low voltage connector terminals on the second side surface of the semiconductor device, near the low voltage side.

61. The method of claim 60, further comprising the step of:
connecting the high voltage connector terminals to terminals of a high voltage semiconductor device, one by one, in a predetermined order.

62. The method of claim 61, further comprising the step of:
connecting the low voltage connector terminals to terminals of a low voltage semiconductor device, one by one, in a predetermined order.

63. The method of claim 60, further comprising the steps of:
counting a number of the capacitor and transistor terminals distributed on the first side surface of the semiconductor device;
counting a number of the high and low voltage connector terminals distributed on the second side surface of the semiconductor device;
determining whether the number of the high and low voltage connector terminals is greater than the number of the capacitor and transistor terminals; and
redistributing the high and low voltage connector terminals according to the determination result.

64. The method of claim 63, wherein a part of the high and low voltage connector terminals are moved to the first side surface of the semiconductor device.

65. The method of claim 63, wherein a part of the high and low voltage connector terminals are moved to a third side surface perpendicular to the first side surface of the semiconductor device.

66. A terminal arrangement method, comprising the steps of:
arranging a plurality of capacitor terminals on a first side of a semiconductor device; and
arranging a plurality of transistor terminals on the first side of the semiconductor device.

67. The method of claim 66, further comprising the step of:
arranging the capacitor terminals and transistor terminals in order from a high voltage side to a low voltage side.

68. The method of claim 67, further comprising the step of:
arranging the capacitor terminals and the transistor terminals in a predetermined order.

69. The method of claim 68, wherein the transistor terminals are arranged next to the capacitor terminals.

70. The method of claim 67, further comprising the steps of:
arranging a plurality of high voltage connector terminals on a second side opposite to the first side of the semiconductor device, near the high voltage side; and
arranging a plurality of low voltage connector terminals on the second side of the semiconductor device, near the low voltage side.

71. The method of claim 70, further comprising the step of:
connecting the high voltage connector terminals to terminals of a high voltage semiconductor device, one by one, in a predetermined order.

72. The method of claim 71, further comprising the step of:
connecting the low voltage connector terminals to terminals of a low voltage semiconductor device, one by one, in a predetermined order.

73. The method of claim 70, further comprising the steps of:
counting a number of the capacitor and transistor terminals arranged on the first side of the semiconductor device;
counting a number of the high and low voltage connector terminals arranged on the second side of the semiconductor device;
determining whether the number of the high and low voltage connector terminals is greater than the number of the capacitor and transistor terminals; and
redistributing the high and low voltage connector terminals according to the determination result.

74. The method of claim 73, wherein a part of the high and low voltage connector terminals are moved to the first side of the semiconductor device.

75. The method of claim 74, wherein a part of the high and low voltage connector terminals are moved to a third side perpendicular to the first side of the semiconductor device.

* * * * *